United States Patent
Wang

(10) Patent No.: US 8,221,868 B2
(45) Date of Patent: Jul. 17, 2012

(54) FINISHED PRODUCT STRUCTURE FORMED BY IN-MOLD DECORATION PROCESS

(75) Inventor: Ching-Tu Wang, Taoyuan County (TW)

(73) Assignee: Sunteng New Technology Co., Ltd., Taoyuan County (TW)

( * ) Notice: Subject to any disclaimer, the term of this patent is extended or adjusted under 35 U.S.C. 154(b) by 157 days.

(21) Appl. No.: 12/887,035

(22) Filed: Sep. 21, 2010

(65) Prior Publication Data

US 2011/0177295 A1 Jul. 21, 2011

(30) Foreign Application Priority Data

Jan. 20, 2010 (TW) ............................... 99101435 A

(51) Int. Cl.
*B32B 3/00* (2006.01)
(52) U.S. Cl. ........................... 428/121; 428/98; 428/172
(58) Field of Classification Search .................. 428/121, 428/98, 172
See application file for complete search history.

(56) References Cited

FOREIGN PATENT DOCUMENTS

TW 200819272 5/2008

*Primary Examiner* — Brent Ohern
(74) *Attorney, Agent, or Firm* — Muncy, Geissler, Olds & Lowe, PLLC

(57) ABSTRACT

A finished product structure formed by In-mold decoration process includes an electromagnetic protective material, a bearing layer and a formed plastic material. The electromagnetic protective material includes a metal film, a structure reinforced layer and an electromagnetic isolation layer. The structure reinforced layer is located between the metal film and electromagnetic isolation layer to enhance physical strength of the electromagnetic protective material. The bearing layer includes an adhesive surface laid with an adhesive layer and a bearing surface. The adhesive surface faces the electromagnetic protective material. The electromagnetic protective material and bearing layer are disposed in a mold, and plastic material is injected onto the bearing surface through a plastic material runner to form the formed plastic material. The formed plastic material includes a first surface bonded to the bearing surface and a second surface on another side opposite to the first surface.

10 Claims, 5 Drawing Sheets

FINISHED PRODUCT STRUCTURE FORMED BY IN-MOLD DECORATION PROCESS

FIELD OF THE INVENTION

The present invention relates to a finished product structure formed by in-mold decoration (IMD) process and particularly to a finished product containing an electromagnetic isolation layer formed by IMD process.

BACKGROUND OF THE INVENTION

Industrial products, in addition to providing desirable performance, also must improve appearance, touch feeling and identification of the product through innovative and aesthetic profile design to enhance product orientation and prices on the market. Many conventional industrial products, such as handsets or notebook computers, have plastic casings. Although some of them are coated with paint to provide shades different from plastics, they still have notable plastic touch feeling. After being used for a period of time or being subjected to abrasion, the paint on the surface is worn away and the plastic surface is exposed. Hence the plastic casing coated with paint generally does not have attractive appearance and desirable touch feeling.

To remedy the aforesaid shortcomings, In-Mold decoration (IMD) technique has been developed. IMD technique has gone through a lot of progress and now can be divided into many types of processes such as IMR (In-Mold Roller), IMF (In-Mold Forming), etc. Its core concept includes placing a decorative film printed with designed colors and patterns in an injection mold, then plastic material is directly injected onto the decorative film to couple the plastic material and decorative film together to form a finished product. A reference can be found in R.O.C. publication No. 200819272 entitled "In-Mold decoration printing method". It discloses that a patterned film is pre-disposed on the inner wall of a mold. The mold has a pouring opening to inject plastic material into a mold cavity to couple with the patterned film. To avert creases from forming on the patterned film during injection of the plastic material, the mold has a plurality of air inlets communicating with the mold cavity to introduce airflow inside so that the plastic material is squeezed on the patterned film by the airflow, and the patterned film is smoothly and flatly attached to the inner wall of the mold. The aforesaid reference adopts IMD technique by injecting plastic material onto the film which provides diversified patterns and colors on outer surface of the film.

With constant developments of the IMD technique, its production speed and cost and product yield, appearance and physical strength have been greatly improved. However, the finished products formed by IMD provide merely alteration of the external appearance. Some electronic products need a further process by disposing electromagnetic isolation material on the finished products. This results in higher design and production costs. To further improve the IMD technique, other materials aside from attaching a decorative film on the finished product can be added to provide superior characteristics for the invention.

SUMMARY OF THE INVENTION

In view of the conventional IMD technique still having room for improvement, the primary object of the present invention is to provide an improved IMD process to provide additional functions for finished products in addition to attractive appearance.

The present invention provides a finished product structure formed by IMD process. The finished product includes an electromagnetic protective material, a bearing layer and a formed plastic material. The electromagnetic protective material includes a metal film, a structure reinforced layer and an electromagnetic isolation layer. The metal film has a pattern zone on the surface. The structure reinforced layer is located between the metal film and electromagnetic isolation layer to enhance the physical strength of the electromagnetic protective material. The bearing layer includes an adhesive surface laid with an adhesive layer and a bearing surface. In the IMD process, the electromagnetic protective material is placed in a female mold. The bearing layer is located above the electromagnetic protective material with the adhesive surface of the bearing layer facing the electromagnetic protective material. More specifically, the adhesive surface of the bearing layer faces the electromagnetic isolation layer of the electromagnetic protective material. After the male and female molds are coupled together, a mold cavity is formed between them, and the plastic material is injected into the mold cavity through a plastic material runner and becomes the formed plastic material on the bearing surface of the bearing layer. The formed plastic material has a first surface coupled with the bearing surface and a second surface on another side opposite to the first surface. With the bearing layer bridging the electromagnetic protective material and formed plastic material, damage of the electromagnetic protective material that might take place caused by pressure or temperature can be avoided. The finished product structure thus formed is adaptable to casings or face panels of varying products (such as casings of electronic devices, transportation equipment or the like, just examples but not the limitation). Thus the pattern zone on the surface of the electromagnetic protective material provides desired diversity and attractive appearance for the product. In addition, with the electromagnetic protective material containing the electromagnetic isolation layer, it can isolate electromagnetic waves to avoid signal interference.

In short, the invention employs the IMD process to provide a finished product with an attractive appearance and also can isolate electromagnetic waves, and is widely adapted to various products.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
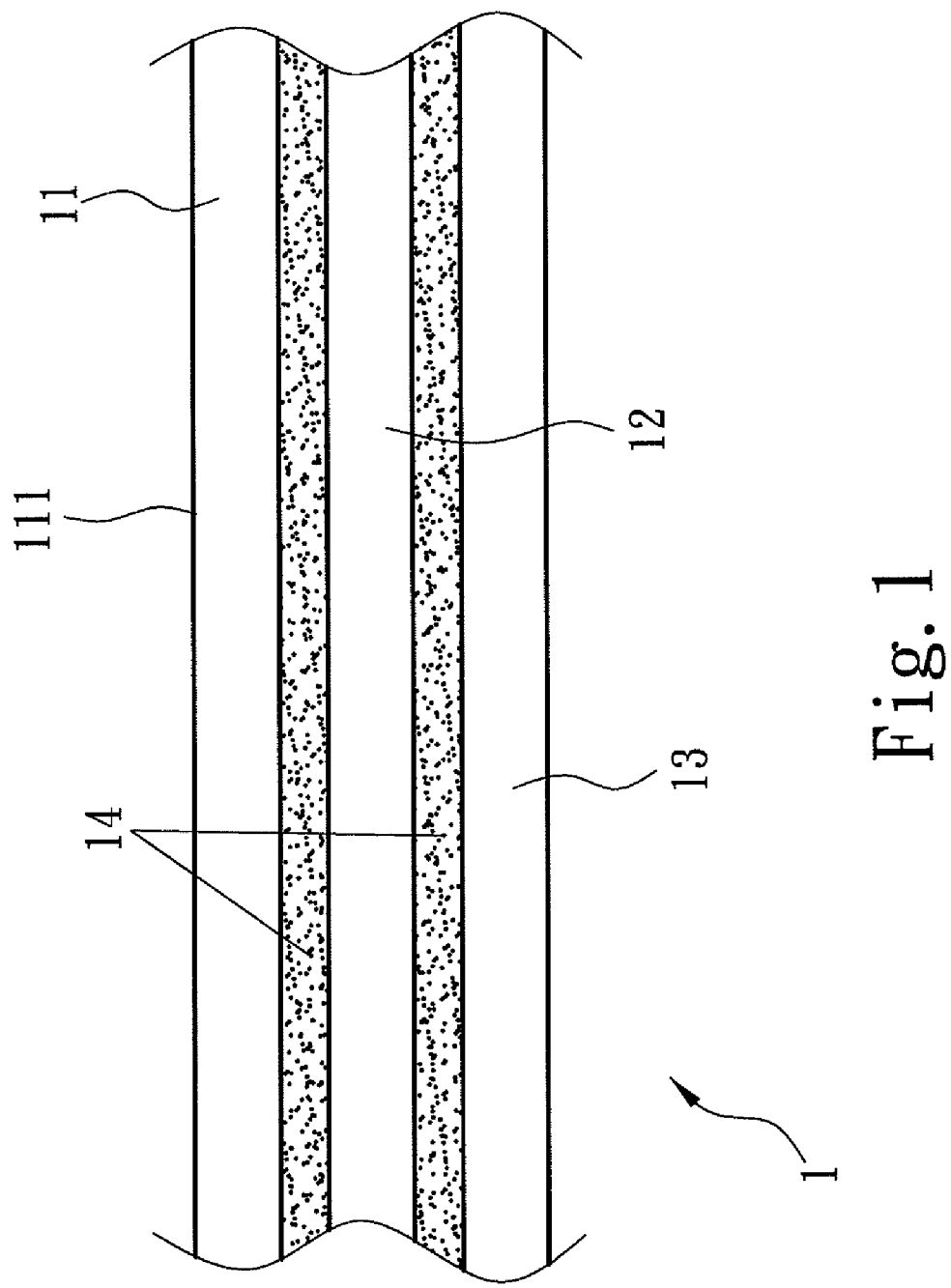
FIG. 1 is a schematic view of the structure of the electromagnetic protective material.

The present invention aims to provide a finished product structure formed by IMD process. The finished product structure includes an electromagnetic protective material, a bearing layer and a formed plastic material. Referring to FIG. 1, the electromagnetic protective material 1 includes a metal film 11, a structure reinforced layer 12 and an electromagnetic isolation layer 13. The metal film 11 and structure reinforced layer 12 are bonded by an adhesive layer 14 between them. The structure reinforced layer 12 and the electromagnetic isolation layer 13 also are bonded by another adhesive layer 14 between them. The metal layer 11 is formed at a thickness between 0.02 mm and 1.0 mm. The metal layer 11 has a pattern zone 111 on the surface. The metal layer 11 has another side opposite to the pattern zone 111 to bond to the structure reinforced layer 12 through the adhesive layer 14. The structure reinforced layer 12 is interposed between the metal film 11 and electromagnetic isolation layer 13 to enhance the physical strength of the electromagnetic protective material 1. The structure reinforced layer 12 is formed at a thickness between 0.02 mm and 1.0 mm. The structure reinforced layer 12 is made of a material selected from the group consisting of Polyethylene terephthalate (PET), Polyethylene naphthalate (PEN), Polyethylene glycol-co-cyclohexane-1,4 dimethanol terephthalate (PETG), Thermalplastic polyurethane (TPU), Polyurethane (PU), Polypropylene (PP), Polycarbonate (PC), Amorphous polyethylene terephthalate (A-PET), Polyvinyl chloride (PVC), Acrylic, Methylmethacrylate-styrene (MS), Acrylonitrile-butadiene-styrene copolymer, Polystyrene (PS), Polyoxymethylene (POM), Nylon, and combinations thereof. Material selection of the structure reinforced layer 12 can be made according to pressure-resistant or heat-resistant capability required. The structure reinforced layer 12 has one side boned to the metal film 11 and another side opposite to the metal film 11 bonded to the electromagnetic isolation layer 13 which is a metal mesh, metal plating layer or metal weaving fabric to isolate electromagnetic waves. The aforesaid layers are bonded together to form the electromagnetic protective material 1. The pattern zone 111 on the surface of the metal film 11 provides pre-designed patterns or textures.

Figure 2A:
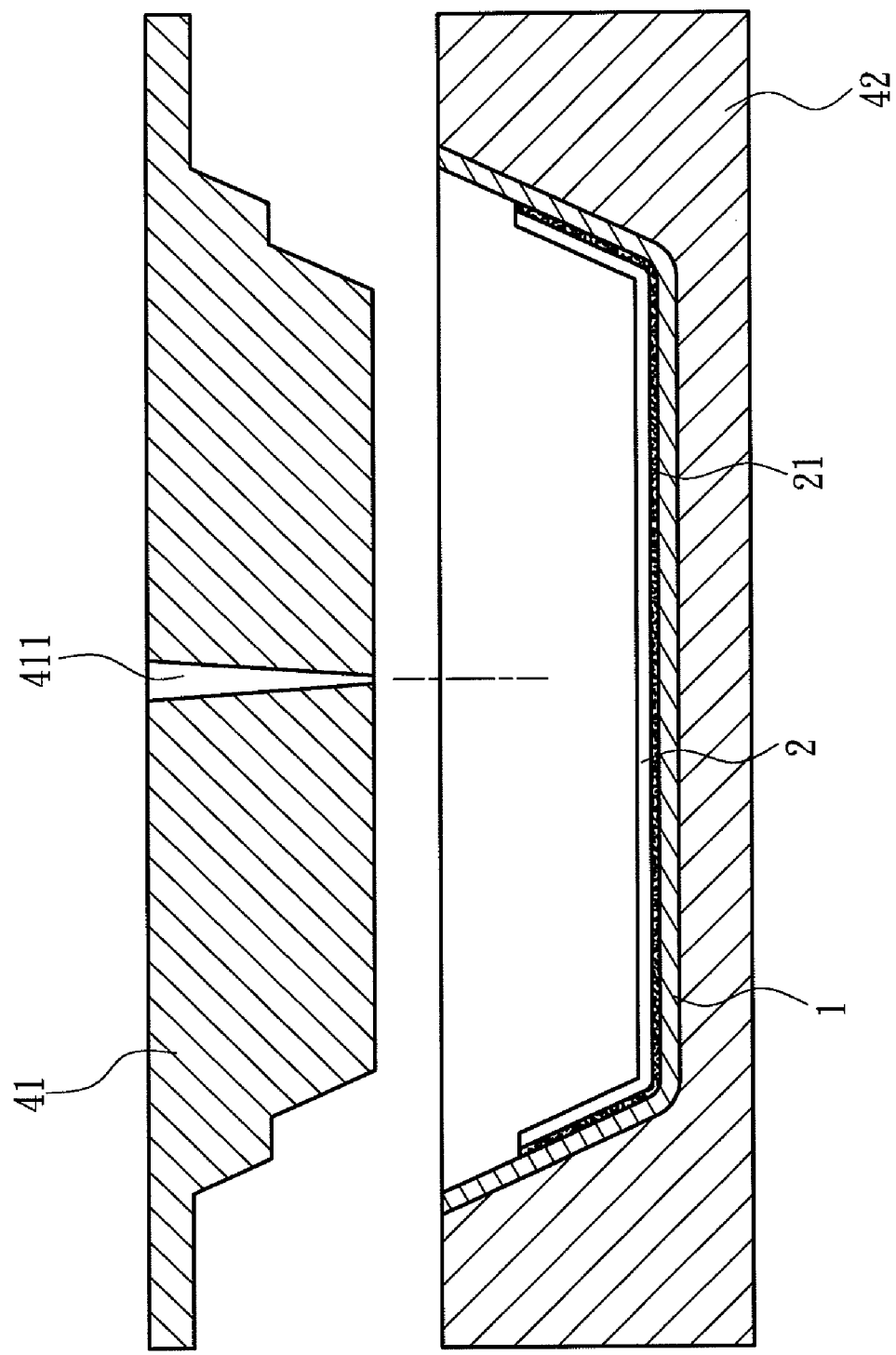
FIG. 2A is a schematic view of IMD process.
Figure 2B:
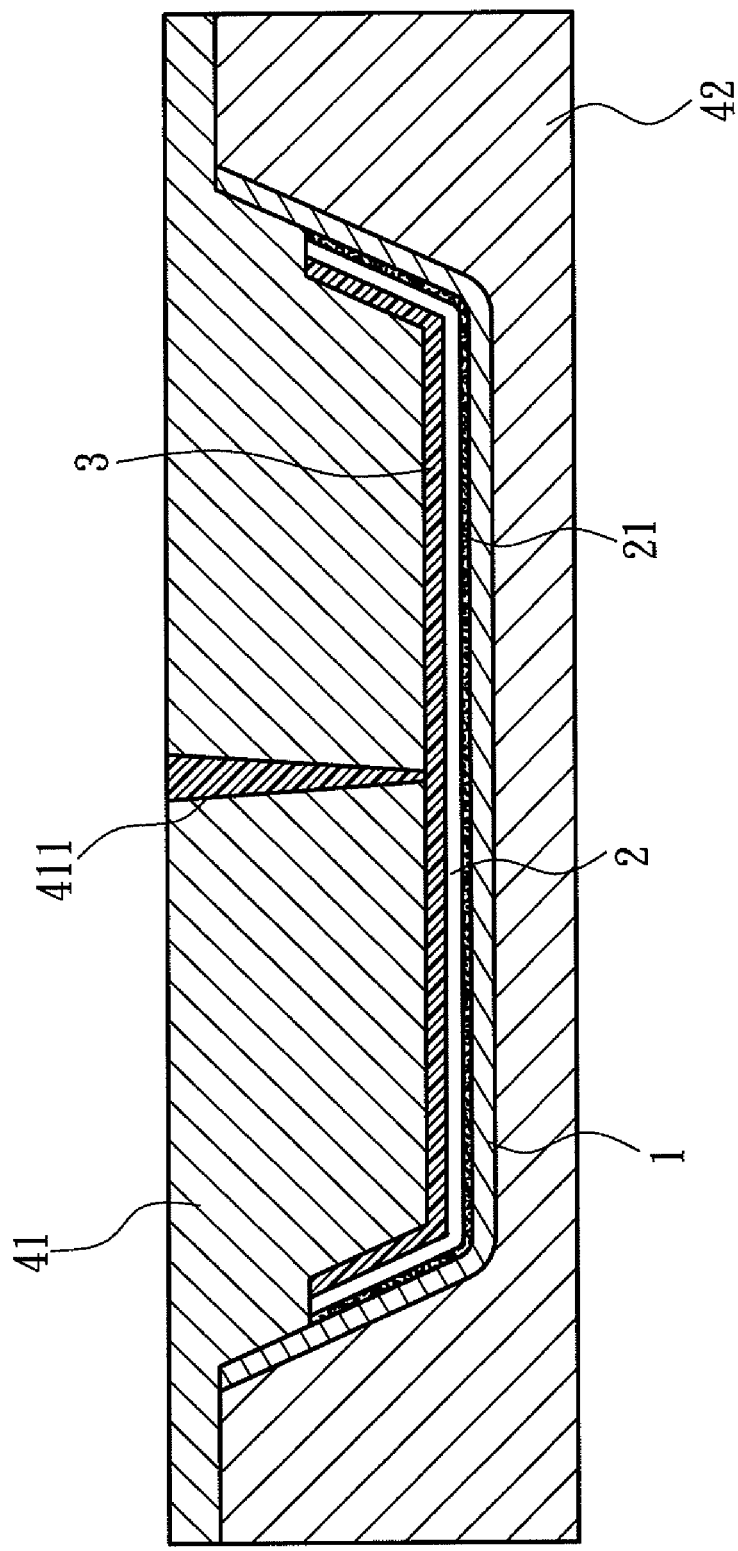
FIG. 2B is another schematic view of IMD process.
Figure 3A:
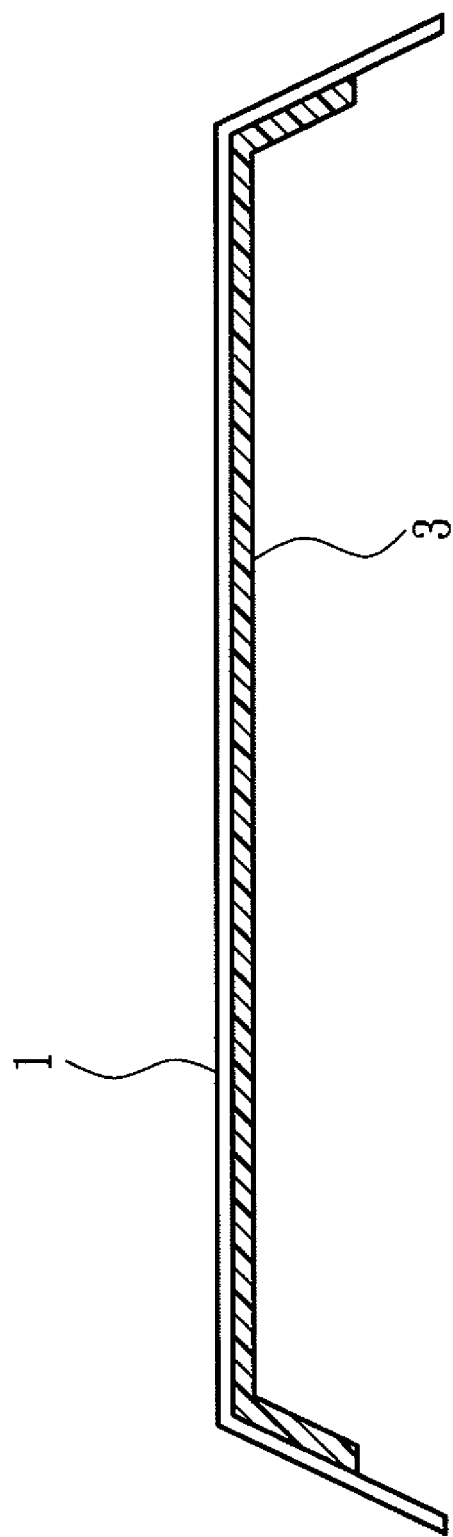
FIG. 3A is a schematic view of the bend section before forming.
Figure 3B:
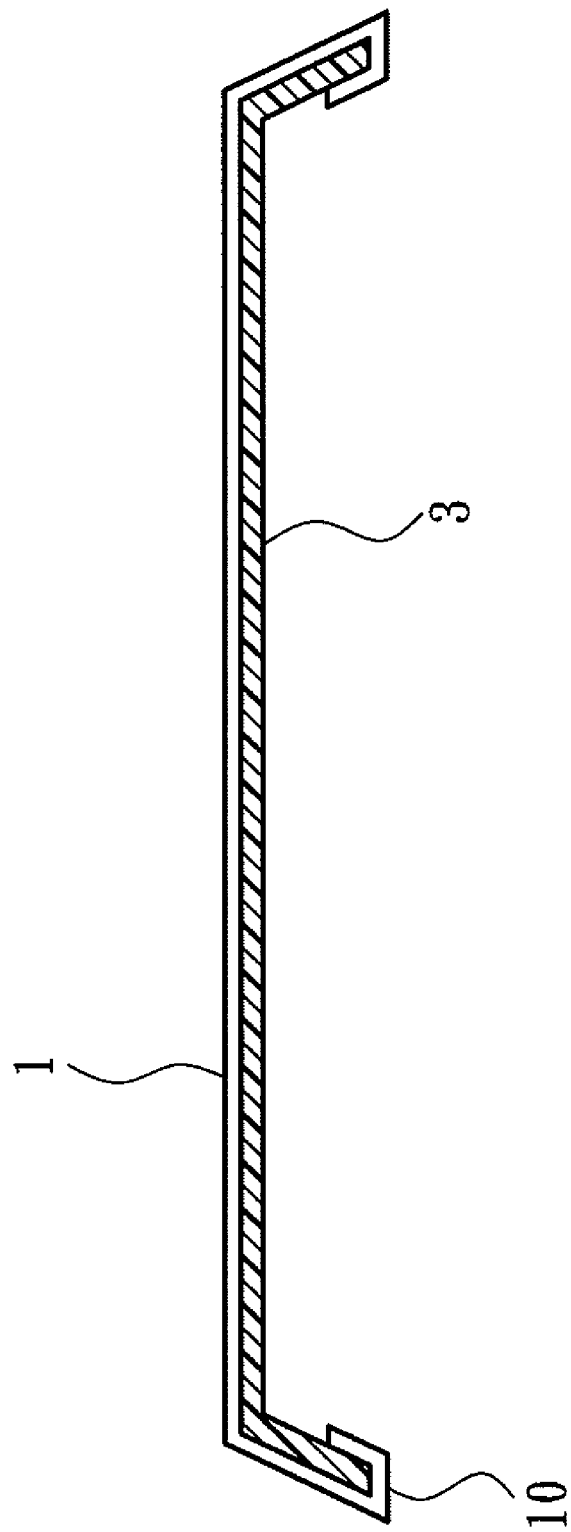
FIG. 3B is a schematic view of the bend section after forming.

The electromagnetic protective material 1 can be adopted in IMD process incorporating with other structures. Referring to FIGS. 2A and 2B, a male mold 41 and a female mold 42 are provided. The male mold 41 has at least one plastic material runner 411. During the IMD process, the electromagnetic protective material 1 is disposed first in the female mold 42, and the length of a bend section 10 is reserved based on the calculated length of a finished product (also referring to FIGS. 3A and 3B) that will be discussed later. Then a bearing layer 2 is placed in the female mold 42 above the electromagnetic protective material 1. The bearing layer 2 includes a bearing surface and an adhesive surface laid with an adhesive layer 21. The adhesive surface faces the electromagnetic isolation layer 13 of the electromagnetic protective material 1. When the male mold 41 and female mold 42 are coupled together, a mold cavity is formed between them, and the plastic material is injected onto the bearing surface of the bearing layer 2 through the plastic material runner 411 to form the formed plastic material 3 in the mold cavity. The bearing layer 2 must have sufficient pressure-resistant and temperature-resistant capability to withstand the pressure and temperature of plastic material injection. In addition to avoid damage of the electromagnetic protective material 1 caused by the pressure or temperature, the bearing layer 2 also serves as a medium to bridge the electromagnetic protective material 1 and formed plastic material 3. The formed plastic material 3 has a first surface on one side bonded to the bearing surface, and a second surface on another side opposite to the first surface. The structure formed by the aforesaid IMD process is shown in FIGS. 3A and 3B. The electromagnetic protective material 1, bearing layer 2 and formed plastic material 3 are bonded together through the compression and injection of the male mold 41 and female mold 42 (as the bearing layer 2 is formed at a thinner thickness, and the formed plastic material 3 and bearing layer 2 are respectively formed in a melted condition due to the high temperature and pressure during the injection process of the formed plastic material 3, the bearing layer 2 is melted on the surface of the formed plastic material 3, hence the bearing layer 2 is not shown in FIGS. 3A and 3B). Moreover, due to the bearing layer 2 and the electromagnetic protective material 1 are located in opposite positions in the female mold 42, the electromagnetic protective material 1 is located on the side of the adhesive surface of the bearing layer 2, and the formed plastic material 3 is located on the side of the bearing surface of the bearing layer 2. As the electromagnetic protective material 1 has reserved a length in the IMD process, thus has a coverage area formed at a dimension mating the bearing layer 2 and the formed plastic material 3, and includes at least one bend section 10 extended beyond the coverage area. Referring to FIG. 3B, the reserved length of the electromagnetic protective material 1 is bent to attach to the second surface of the formed plastic material 3 to form the bend section 10 so that the electromagnetic protective material 1 fully covers one side of the bearing layer 2 and formed plastic material 3 to form the finished product structure. The bend section 10 also can be connected to at least one grounding point (not shown in the drawings) after bent and assembled with a product to direct electric charges to the grounding point.

The finished product structure thus formed can isolate electromagnetic waves through the electromagnetic isolation layer 13. The metal film 11 can be made of aluminum, copper, stainless steel or a nickel alloy. Aside from providing attractive appearance, the metal film also offers high texture feeling and protective effect. The finished product shown in the drawings is merely an embodiment for illustrative purpose, and is not the limitation of the invention. The shape of the mold can be changed to form the finished products in varying styles and sizes. Through shaping of the mold provides customization for the finished products adaptable to casings or face panels of various products (such as casings of electronic equipment, transportation equipment or the like).

While the invention has been described by means of specific embodiments, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A finished product structure formed by in-mold decoration process, comprising:
    an electromagnetic protective material including a metal film which includes a pattern zone on the surface, a structure reinforced layer and an electromagnetic isolation layer; the structure reinforced layer being located between the metal film and the electromagnetic isolation layer to enhance physical strength of the electromagnetic protective material;
    a bearing layer including a bearing surface and an adhesive surface laid with an adhesive layer which is attached to the electromagnetic protective material in the in-mold decoration process; and
    a formed plastic material which is injected onto the bearing surface during the in-mold decoration process and includes a first surface bonded to the bearing surface and a second surface.

2. The finished product structure of claim 1, wherein the metal film is selectively made of aluminum, copper, stainless steel or a nickel alloy.

3. The finished product structure of claim 2, wherein the electromagnetic protective material includes a coverage area formed at a dimension mating the bearing layer and the formed plastic material and at least one bend section extended beyond the coverage area, the bend section being bent to attach to the second surface of the formed plastic material.

4. The finished product structure of claim 2, wherein the electromagnetic protective material includes a coverage area formed at a dimension mating the bearing layer and the formed plastic material and at least one bend section extended beyond the coverage area, the bend section being bent to connect to at least one grounding point.

5. The finished product structure of claim 1, wherein the metal film is formed at a thickness between 0.02 mm and 1.0 mm.

6. The finished product structure of claim 1, wherein the structure reinforced layer is formed at a thickness between 0.02 mm and 1.0 mm.

7. The finished product structure of claim 1, wherein the structure reinforced layer is made of a material selected from the group consisting of Polyethylene terephthalate (PET), Polyethylene naphthalate (PEN), Polyethylene glycol-co-cyclohexane-1,4 dimethanol terephthalate (PETG), Thermalplastic polyurethane (TPU), Polyurethane (PU), Polypropylene (PP), Polycarbonate (PC), Amorphous polyethylene terephthalate (A-PET), Polyvinyl chloride (PVC), Acrylic, Methyl-methacrylate-styrene (MS), Acrylonitrile-butadiene-styrene copolymer, Polystyrene (PS), Polyoxymethylene (POM), Nylon, and combinations thereof.

8. The finished product structure of claim 1, wherein the metal film and the structure reinforced layer are bonded by the adhesive layer interposed therebetween, the structure reinforced layer and the electromagnetic isolation layer also being bonded by another adhesive layer.

9. The finished product structure of claim 1, wherein the bearing layer is bonded to the electromagnetic isolation layer of the electromagnetic protective material through the adhesive layer of the adhesive surface.

10. The finished product structure of claim 1, wherein the electromagnetic isolation layer is selectively a metal mesh, a metal plating layer or a metal weaving fabric.

* * * * *